US012670338B2

(12) United States Patent
Shi et al.

(10) Patent No.: US 12,670,338 B2
(45) Date of Patent: Jun. 30, 2026

(54) PROVIDING AD HOC ENRICHED TERM RELATED CORPUS FOR LANGUAGE SUPPORT ASSISTANT SERVICES

(71) Applicant: INTERNATIONAL BUSINESS MACHINES CORPORATION, Armonk, NY (US)

(72) Inventors: Jin Shi, Ningbo (CN); Chih-Yuan Lin, New Taipei City (TW); Shu-Chih Chen, New Taipei City (TW); Pei-Yi Lin, New Taipei City (TW); Chao Yuan Huang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 18/321,414

(22) Filed: May 22, 2023

(65) Prior Publication Data

US 2024/0394484 A1     Nov. 28, 2024

(51) Int. Cl.
*G06F 40/47* (2020.01)
*G06F 40/242* (2020.01)
*G06F 40/49* (2020.01)

(52) U.S. Cl.
CPC ............ *G06F 40/47* (2020.01); *G06F 40/242* (2020.01); *G06F 40/49* (2020.01)

(58) Field of Classification Search
None
See application file for complete search history.

(56) References Cited

U.S. PATENT DOCUMENTS

| 6,789,057 B1 | 9/2004 | Morimoto | |
| 6,996,520 B2 | 2/2006 | Levin | |
| 8,577,910 B1 * | 11/2013 | Hodge | G06F 16/3337 |
| | | | 706/14 |
| 9,229,924 B2 | 1/2016 | Sun | |

(Continued)

OTHER PUBLICATIONS

Vuong et al. "Does More Context Help? Effects of Context Window and Application Source on Retrieval Performance". ACM Transactions on Information Systems (TOIS), vol. 40, Issue 2 (Apr. 2022) (Year: 2022).*

(Continued)

*Primary Examiner* — Jesse S Pullias
(74) *Attorney, Agent, or Firm* — Lily Neff

(57) ABSTRACT

A method, computer system, and a computer program product are provided for responding to a language input query with ad hoc enriched term data. The technique comprises extracting information relating to the language input query using a Language Support Assistance Service. The extracted information includes one or more language terms requiring further support and an associated request type. This is identified from metadata relating to the language input query. Information is provided to a Term Related Corpus Data Service that includes one or more language terms requiring further support and the identified request type and any identified sources. The Term Related Corpus Data Service returns one or more ad hoc enriched terms that are tailored to the one or more language terms requiring further support and is according to the associated request type. The Language Support Assistance Service provides a response to the language input query.

19 Claims, 3 Drawing Sheets

(56) References Cited

U.S. PATENT DOCUMENTS

| | | | | |
|---|---|---|---|---|
| 2007/0250494 | A1* | 10/2007 | Peoples | G06F 16/3337 |
| | | | | 707/E17.073 |
| 2008/0249760 | A1 | 10/2008 | Marcu | |
| 2010/0070521 | A1* | 3/2010 | Clinchant | G06F 16/3337 |
| | | | | 707/E17.139 |
| 2010/0094845 | A1* | 4/2010 | Moon | G06F 16/3334 |
| | | | | 707/E17.014 |
| 2015/0039286 | A1 | 2/2015 | Nikoulina | |
| 2015/0331854 | A1 | 11/2015 | Alshinnawi | |
| 2017/0161360 | A1* | 6/2017 | Barsukova | G06F 16/3344 |
| 2021/0034704 | A1* | 2/2021 | Gentile | G06F 40/30 |
| 2021/0042475 | A1 | 2/2021 | Zhang | |
| 2021/0397654 | A1* | 12/2021 | Carrier | G06F 40/20 |
| 2022/0067308 | A1* | 3/2022 | Mishra | G06F 40/51 |

OTHER PUBLICATIONS

Delpech, et al., "Extraction of Domain-Specific Bilingual Lexicon From Comparable Corpora: Compositional Translation and Ranking", arXiv:1210.5751 [cs.CL], Oct. 21, 2012, 19 pgs., <https://arxiv.org/ftp/arxiv/papers/1210/1210.5751.pdf>.

Ren, "A Method of Domain Dictionary Construction for Electric Vehicles Disassembly", Entropy, MDPI, Mar. 3, 2022, 24(3), 26 pgs., <https://www.ncbi.nlm.nih.gov/pmc/articles/PMC8947409/>.

* cited by examiner

100

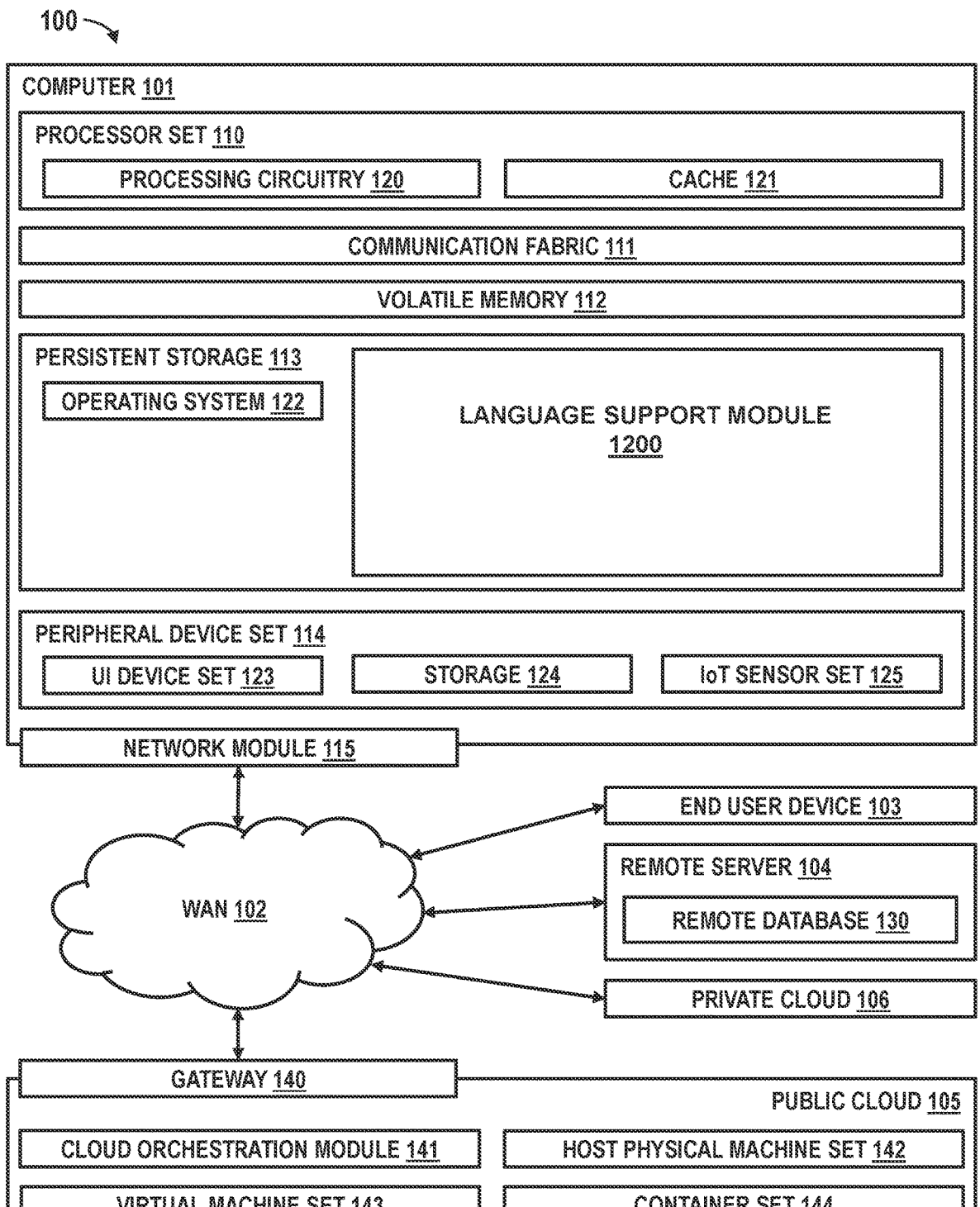

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

LANGUAGE SUPPORT MODULE 1200

PERIPHERAL DEVICE SET 114

UI DEVICE SET 123

STORAGE 124

IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

Start

Receive or obtain input
210

Access language Support Assistance
Service for input processing
220

Access made to Term Related Corpus
data Service for input processing
230

Provide Response to Input Request
240

Update Term related Corpus Data Service
as appropriate
250

End

PROVIDING AD HOC ENRICHED TERM RELATED CORPUS FOR LANGUAGE SUPPORT ASSISTANT SERVICES

BACKGROUND

The present invention relates generally to the field of data management and more particularly to techniques for providing ad hoc enriched terms for language support assistant services.

Despite the many resources available, searching for a definition or accuracy of a term has become more challenging. This may be because there may be too many resources available that provide conflicting responses, especially in a large computing environment such as the cloud. One of the challenges when researching terms occurs when the terms may not be commonly used or when they may be overshadowed by a more popular term. In some instances, the term may be only meaningful with respect to a particular field or a particular usage. A similar problem exists with translation tools, especially when using one or more machine learning (ML) models. Some examples may include issues arising using online translation tools of a web page, or when using a spell-checking plug-in of a particular application.

In some instances, the prior art uses a customizable term dictionary that can be updated by the end users. However, this limits the dictionary to the use of the end users or their skillset. Unfortunately, in many instances, the end users may not have the best knowledge of a particular domain and/or application.

SUMMARY

Embodiments of the present invention disclose a method, computer system, and a computer program product for responding to a language input query with ad hoc enriched term data. The technique comprises extracting information relating to the language input query using a Language Support Assistance Service. The extracted information includes one or more language terms requiring further support. The Language Support Assistance Service identifies from metadata relating to the language input query, a language type and any sources for providing further support. Information is provided to a Term Related Corpus Data Service that includes one or more language terms requiring further support and the identified request type and any identified sources. The Term Related Corpus Data Service returns to the Language Support Assistance Service one or more ad hoc enriched terms. The ad hoc enriched terms may be tailored to the one or more language terms requiring further support and is according to the associated request type. The Language Support Assistance Service provides a response to the language input query using the ad hoc enriched terms.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings:

FIG. 1 illustrates a networked computer environment according to at least one embodiment;

DETAILED DESCRIPTION

Figure 2:
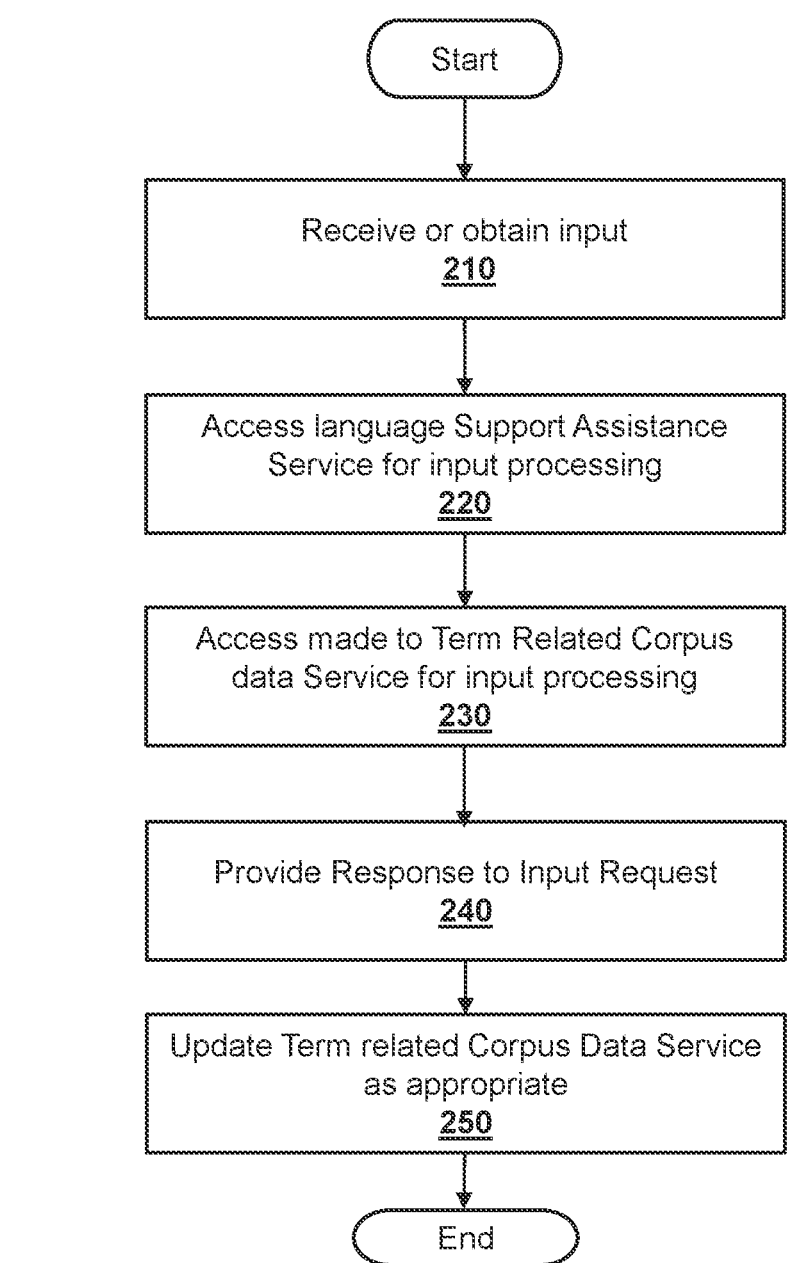
FIG. 2 provides an operational flowchart for providing ad hoc enriched term data in response to a query, according to one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as code change differentiator which is capable of providing language support as per module (1200). In addition to this block 1200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 1200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 1200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 provides a flowchart depiction of one embodiment to provide an ad hoc enriched term in response to a language search query. Process 200 when used in an application can identify a terminology and the domain from the application from the metadata. This provides an accurate response in all instances including those that come from a specific usage. Unfortunately, currently in many instances, an automatic determination of application "domain" may not be appropriate for the assistant tools to use a more specific dictionary. However, this solution can only provide a general domain scope dictionary (e.g., medical, IT, education or the like).

In Step 210, input may be received that needs some type of assistance from a term related data service. The input may be a query that may be received or obtained and may be initiated from a person (an end user) or even an artificial intelligence (AI) machine or any other device. The input query (hereinafter input) may require assistance from a variety of different services and service types. Some examples may include spell checking, grammar checking, auto entry completion; or alternatively translation, definition, or enhancing of the terminology or even some form of a speech to text service.

In Step 220, the Language Support Assistance Service may be accessed to further process the input request. The Language Support Assistance Service can handle the processing service of the input received. The Language Support Assistance Service, in one embodiment, can host a number of services for a host application. In one embodiment, the host application can be a third-party language processing service. Some examples may include but are not limited to services such as input method editor (IME), an online translation service or a spelling checker, etc. used by the applications which consume language support services.

In one embodiment, the service can identify the terminology provider and the domain of the application from the metadata when the assistant service may be used. In this case, the service may then make a query through the Term Query Service to the Corpus Data Service, according to the identified domain and request type.

In Step 230, the Language Support Assistant Service will communicate with a Term Related Corpus Data Service to obtain more information on the input received. The Term Related Corpus Data Service then returns a list of ad-hoc enriched terms which may be tailored to that request type for the domain back to the Assistant Service. The Term Related Corpus Data Service can provide a variety of functions. For example, in one embodiment, the Term Related Corpus Data Service may receive and maintain domain specific terminology and enriched data (translations, speech . . . ) from the applications which consume language support services or other terminology providers. It may also create and maintain domain specific terminology and enriched data (translations, speech . . . ) on its own. It may also return a list of tailored ad-hoc enriched terms for the requested domain and type. In alternate embodiments, other functions may also be provided as can be appreciated by those skilled in the art.

In Step 240, the response to the input request may be provided back to the end user. In addition, as provided in Step 250, the Term Related Corpus Data Service may be updated as appropriate. That is if there needs to be additions, deletions or modifications of any sort arising from the process of handling the input request will be made to the Corpus. This may include modifying the Term Related Corpus data Service to amend, delete or add information.

Figure 3:
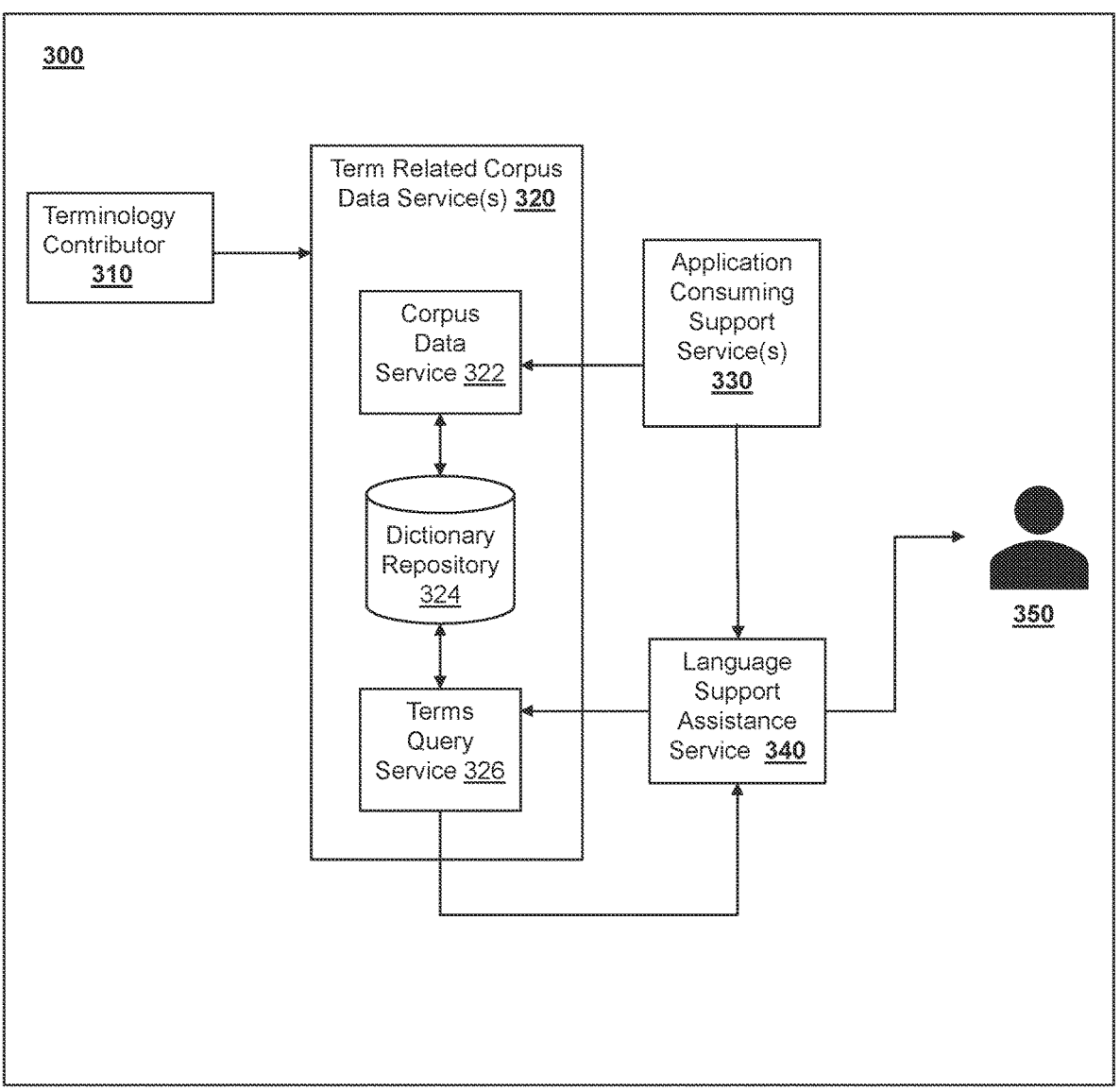
FIG. 3 provides a block diagram of an architectural view of a system providing the methodology as per the embodiment of FIG. 2.

The process 200, therefore provides a flexible and extensible architecture as shown in FIG. 3, to dynamically determine and acquire optimized and enriched terminologies, which may be provided by the applications which consume language support services (who has the best knowledge of the terms) at run-time to effectively solve the problem.

FIG. 3 provides a block diagram illustrating the architecture of system 300 as mentioned and in conjunction with the methodology discussed in FIG. 2, as per one embodiment. The system 300 includes a communication protocol to enable third party language support assistance services to provide domain of the application and request type of the assistance service. A metadata format may be provided to enable the applications which consume language support services to declare the corpus data service provider and term domain. These and other processes are enabled to completion through the different components such as illustrated.

The system 300, in one embodiment, comprises of a Term Related Corpus Data Service(s) 320 and Language Support Assistance Service 340. Language Support Assistance Service provides assistance to an end user 350. The end user 350 can be a person or a device or application that provides input recommendation to the end user and has language support requirements. These requirements can be very varied and range from definition and dictionary type needs to translation requirements to speech and grammar requirements.

The Language Support Assistance Service 340 may be in communication with the end user 350. It provides term and necessary data to the end user according to the request. It provides an e output to the received required input from the end user. As illustrated, as per one embodiment, the Language Support Assistance Service 340 queries the Term Related Corpus Data Service(s) 320 (such as by domain and request type). The Term Related Corpus Data Service(s) 320 provide Language Support Assistance Services 340 ad-hoc enriched terms and other information needed to help provide the response to the received input request.

The application consumes the language support services as illustrated by Application Consuming Support Services 330 and may be responsible for receiving/extracting metadata and providing it to the Language Support Assistance Service 340. It also contributes domain terms to the Term Related Corpus Data Service(s) 320. In one embodiment, it may be used by end users under a specific application area or domain. In one embodiment, the Application Consuming Support Services 330 can build up a private Term Related Corpus Data Service or use a third-party service to enrich domain specific terminologies and language related information such as translations or speeches. The Application's (as per 330) domain can be declared in metadata. When an end user utilizes the application through a language support assistant service, the service would get the domain information from the metadata.

For example, the following can be provided to provide ease of understanding. In this example, the representative metadata can be:

<meta name="termServUrl" content="https://xxx">
<meta name="termServApiKey" content="xxx">
<meta name="domain" content="SW Engineering">

In this way, Term Related Corpus Data Service(s) 320, may provide ad hoc enriched term so the Applications which consume language support services (Application Consuming Support Services 330) can declare their supported terminology providers and domains in metadata. The enriched terms may contain term-related corpus such as translations or pronunciation info, depending on the requests. Therefore, when a Language Support Assistant Service 340 may be used in an application, the service can identify the terminology provider and the domain of the application from the metadata, and then make a query to the Term Related Corpus Data Service(s) 320 to obtain a list of ad-hoc enriched terms that fit the current application context, which in turn provides more accurate result (this can include (such as autocompletion, page translation tool, text to speech, etc.)

The Term Related Corpus Data Service(s) 320 receives term maintenance request from both term providers and applications which consume language support Services. It also provides responses to term query requests from third-party language support services, such as IME and Auto translation tools. As illustrated, in one embodiment, it is comprised of a Corpus Data Service(s) 322 which may continuously get updated (add term data etc.) and may contribute the updated data to a Dictionary Repository 324. The Dictionary Repository 324 provides and receives data from the Term Query Service(s) 326. The Term Query Service(s) 326 receives query by domain and request types from Language Support Assistance Service 340 and in turn returns ad hoc term enriched terms/lists with specific requirements back to the Language Support Assistance Service 340. In one embodiment, the retrieved term data may be specific to the specified domain and determined with the request type which may be required by the assistant service. In other words, the Language Support Assistance Service 340 receives tailored enriched term data from the Term Related Corpus Data Service(s) 320.

As illustrated, Term Related Corpus Data Service(s) 320, other than receiving input from the Application Consuming Support Services 330 and the Language Support Assistance Service 340, also receives data/input from a Terminology Contributor 310. The latter can provide definitions and terms from a variety of sources such as dictionary programs etc. to help with specialized terms and translations etc. as needed.

The embodiments provided in FIGS. 2 and 3 can assist in different types of services such as but not limited to text inputs, spell checking, grammar checking, auto entry completion, translation, definition, or enhance the terminology consistency of speech to text service. To provide an case of understanding, some examples can now be discussed. It is to be understood that these are among the many examples and scenarios possible in alternate embodiments, as can be appreciated by those skilled in the art.

In Example A (IME scenario):

1) A user is using an application and attempting to input a phrase into that application which has been associated with the assistant service (in this case an IME assistant service).

2) The assistant service gets the metadata from the application to get the domain information.

3) While the user is inputting, the assistant service queries the corpus data by providing the domain info (from the metadata) and request type. In this case, "request type" could be like:
requestType=TERM_LIST
language=en
withPOS=no/"a second language term or sentence"
includeAcronym=yes/"second language term or sentence"

4) The Corpus Data Service returns the complete phrase and transforms the complete phrase into the format that can be parsed by the assistant service 5) The assistant service completes the correct phrase for the user. For example: the assistant service provides GVT (Globalization Verification Test), so that when user types GVT, it won't be wrongly corrected as GET.

In Example B (Automatic translation Tool):

1) A user is browsing a website which consume the language support service, e.g., translation service, and wants to switch the displayed language from one to another (such as from English to French).

2) The website calls the machine translation assistant service and then send out metadata 3) The machine translation service gets the metadata from the website 4) The machine translation service queries the corpus data by providing the domain info (from the metadata) and request type
In this case, "request type" could be like:
requestType=TRANSLATION
language=en
targetLanguage=fr
locale=fr_CA
fallback=false
DNT=true 5) The Corpus Data Service returns the correspondent terms with translation in French.

As illustrated by the above examples and as discussed earlier, the system and method such as provided in the embodiments discussed in FIGS. 2 and 3 may provide lower maintenance costs (for example, compared with local IME dictionary or dataset) via a more flexible and extensible architecture to acquire the optimized term related corpus data. It may also provide list of ad-hoc enriched terms (translations, pronunciations . . . ). It may return more contextual and accurate corpus data for the language support services.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing ad hoc enriched term data, comprising:

extracting information relating to a language input query using a Language Support Assistance Service, wherein said extracted information includes one or more language terms requiring further support;

said Language Support Assistance Service further identifying from metadata relating to said language input query, an associated request type and any sources for providing language support as appropriate;

generating an Application Consuming Support Service to process metadata associated with said input query and create a list of ad-hoc enriched terms based on said metadata to create a list of enriched terms that will fit a current application context;

said Language Support Assistance Service providing to a Term Related Corpus Data Service one or more language terms requiring any further support and any extracted information as well as said associated request type and any sources identified through at least a domain of an application from metadata, wherein a Corpus includes a large database with storage designed for storing very large amounts of data;

querying a Term Related Corpus Data Service(s) to obtain a list of ad-hoc enriched terms that fit a current application context;

said Term Related Corpus Data Service returning one or more ad hoc enriched terms to said Language Support Assistance Service, wherein a metadata format enables applications which consume language support through a service provider and a term domain;

tailoring said ad hoc enriched terms to said one or more language terms requiring further support according to said associated request type, wherein said Term Related Corpus Data Service uses any identified sources to obtain other terminology from one or more contributors to provide the ad hoc enriched terms; and said Language Support Assistance Service providing a response to said language input query using said ad hoc enriched terms.

2. The method of claim 1, wherein said Term Related Corpus Data Service includes a dictionary repository and a Corpus Data Service.

3. The method of claim 2, further comprising:

updating said dictionary repository with any ad hoc terms identified as a result of the input query received that were not in said dictionary repository previously.

4. The method of claim 1, wherein said language input query is provided through an Application Consuming Support Services.

5. The method of claim 4, wherein said Application Consuming Support Service provides metadata associated with said input query requested to said Language Support Assistance Service.

6. The method of claim 4, wherein said Application Consuming Support Service provides domain terms for said input query received to said Term Related Corpus Data Services.

7. The method of claim 1, wherein said language input query can include one or more terms to be translated.

8. The method of claim 1, wherein said language input query can include one or more terms that need to be defined.

9. The method of claim 1, wherein said language input query can include one or more terms to verify spelling or grammar accuracy.

10. A computer system for providing ad hoc enriched term data, comprising:

one or more processors, one or more computer-readable memories and one or more computer-readable storage media;

program instructions, stored on at least one of the one or more storage media for execution by at least one of the one or more processors via at least one of the one or more memories, to extract information relating to a language input query using a Language Support Assistance Service, wherein said extracted information includes one or more language terms requiring further support;

program instructions, stored on at least one of the one or more storage media for execution by at least one of the one or more processors via at least one of the one or more memories, to identify by the said Language Support Assistance Service from metadata relating to said language input query, an associated request type and any sources for providing language support as appropriate;

program instructions, stored on at least one of the one or more storage media for execution by at least one of the one or more processors via at least one of the one or more memories, to generate an Application Consuming Support Service to process metadata associated with said input query and create a list of ad-hoc enriched terms based on said metadata to create a list of enriched terms that will fit a current application context;

program instructions, stored on at least one of the one or more storage media for execution by at least one of the one or more processors via at least one of the one or more memories, to provide from said Language Support Assistance Service to a Term Related Corpus Data Service one or more language terms requiring further support and said request type and any sources identified through at least a domain of an application from metadata, wherein a Corpus includes a large database with storage designed for storing very large amounts of data;

program instructions, stored on at least one of the one or more storage media for execution by at least one of the one or more processors via at least one of the one or more memories, to querying a Term Related Corpus Data Service(s) to obtain a list of ad-hoc enriched terms that fit a current application context;

program instructions, stored on at least one of the one or more storage media for execution by at least one of the one or more processors via at least one of the one or more memories, to return by said Term Related Corpus Data Service one or more ad hoc enriched terms to said Language Support Assistance Service, wherein a metadata format enables applications which consume language support through a service provider and a term domain;

program instructions, stored on at least one of the one or more storage media for execution by at least one of the one or more processors via at least one of the one or more memories, to tailor said ad hoc enriched terms to said one or more language terms requiring further support according to said associated request type, wherein said Term Related Corpus Data Service uses any identified sources to obtain other terminology from one or more contributors to provide the ad hoc enriched terms; and program instructions, stored on at least one of the one or more storage media for execution by at least one of the one or more processors via at least one of the one or more memories, to provide by said Language Support Assistance Service a response to said language input query using said ad hoc enriched terms.

11. The computer system of claim 10, wherein said Term Related Corpus Data Service includes a dictionary repository and a Corpus Data Service, further comprising:

program instructions, stored on at least one of the one or more storage media for execution by at least one of the one or more processors via at least one of the one or more memories to update said dictionary repository with any ad hoc terms identified as a result of the input query received that were not in said dictionary repository previously.

12. The computer system of claim 11, wherein said language input query is provided through an Application Consuming Support Service that consumes language support services.

13. The computer system of claim 12, wherein said Application provides metadata associated with said input query request to said Language Support Assistance Service.

14. The computer system of claim 12, wherein said Application Consuming Support Service provides domain terms for said input query received to said Term Related Corpus Data Services.

15. The computer system of claim 10, wherein said Term Related Corpus Data Services uses any identified sources to obtain other terminology from one or more contributors to provide the ad hoc enriched terms.

16. The computer system of claim 10, wherein said language input query can include one or more terms to be translated.

17. The computer system of claim 10, wherein said language input query can include one or more terms that need to be defined.

18. The computer system of claim 10, wherein said language input query can include one or more terms to be verified for spelling or grammar accuracy.

19. A computer program product for providing ad hoc enriched term data, the computer program product comprising:

one or more computer readable storage media;

program instructions, stored on at least one or more storage media for execution by at least one or more processors via at least one or more memories, to extract information relating to a language input query using a Language Support Assistance Service, wherein said extracted information includes one or more language terms requiring further support;

program instructions, stored on at least one of the one or more storage media for execution by at least one of the one or more processors via at least one of the one or more memories, to identify by the said Language Support Assistance Service from metadata relating to said language input query, an associated request type and any sources for providing language support as appropriate;

program instructions, stored on at least one of the one or more storage media for execution by at least one of the one or more processors via at least one of the one or more memories, to generate an Application Consuming Support Service to process metadata associated with said input query and create a list of ad-hoc enriched terms based on said metadata to create a list of enriched terms that will fit a current application context;

program instructions, stored on at least one of the one or more storage media for execution by at least one of the one or more processors via at least one of the one or more memories, to provide from said Language Support Assistance Service to a Term Related Corpus Data Service one or more language terms requiring further support and said request type and any sources identified through at least a domain of an application from metadata, wherein a Corpus includes a large database with storage designed for storing very large amounts of data;

program instructions, stored on at least one of the one or more storage media for execution by at least one of the one or more processors via at least one of the one or more memories, to querying a Term Related Corpus Data Service(s) to obtain a list of ad-hoc enriched terms that fit a current application context;

program instructions, stored on at least one of the one or more storage media for execution by at least one of the one or more processors via at least one of the one or more memories, to return by said Term Related Corpus Data Service one or more ad hoc enriched terms to said Language Support Assistance Service, wherein a metadata format enables applications which consume language support through a service provider and a term domain;

program instructions, stored on at least one of the one or more storage media for execution by at least one of the one or more processors via at least one of the one or more memories, to tailor said ad hoc enriched terms to said one or more language terms requiring further support according to said associated request type, wherein said Term Related Corpus Data Service uses any identified sources to obtain other terminology from one or more contributors to provide the ad hoc enriched terms; and program instructions, stored on at least one of the one or more storage media for execution by at least one of the one or more processors via at least one of the one or more memories, to provide by said Language Support Assistance Service a response to said language input query using said ad hoc enriched terms.

* * * * *